(12) United States Patent
Fleck

(10) Patent No.: US 7,776,140 B2
(45) Date of Patent: Aug. 17, 2010

(54) DEVICE FOR REMOVING SOOT PARTICLES FROM AN EXHAUST GAS STREAM

(76) Inventor: Carl M. Fleck, Doktorberg 23 E5, A-2391 Kaltenleutgeben (AT)

( * ) Notice: Subject to any disclaimer, the term of this patent is extended or adjusted under 35 U.S.C. 154(b) by 326 days.

(21) Appl. No.: 11/921,423

(22) PCT Filed: Mar. 21, 2006

(86) PCT No.: PCT/EP2006/060895
§ 371 (c)(1),
(2), (4) Date: Nov. 30, 2007

(87) PCT Pub. No.: WO2006/131406
PCT Pub. Date: Dec. 14, 2006

(65) Prior Publication Data
US 2009/0101016 A1 Apr. 23, 2009

(30) Foreign Application Priority Data
Jun. 8, 2005 (AT) .............................. A 967/2005

(51) Int. Cl.
B03C 3/62 (2006.01)
(52) U.S. Cl. .................... 96/69; 55/282.3; 55/523; 55/DIG. 10; 55/DIG. 30; 60/275; 60/311; 96/143; 96/146
(58) Field of Classification Search ................ 55/282.3, 55/523, DIG. 10, DIG. 30; 60/275, 311; 422/174, 178; 96/69, 84, 143, 146
See application file for complete search history.

(56) References Cited

U.S. PATENT DOCUMENTS

| | | | |
|---|---|---|---|
| 4,505,726 A * | 3/1985 | Takeuchi et al. ............... 55/282 |
| 4,897,096 A | 1/1990 | Pischinger et al. |
| 4,948,403 A | 8/1990 | Lepperhoff et al. |
| 4,979,364 A | 12/1990 | Fleck |
| 5,063,029 A * | 11/1991 | Mizuno et al. .............. 422/175 |
| 5,200,154 A * | 4/1993 | Harada et al. ............... 422/174 |
| 5,245,825 A * | 9/1993 | Ohhashi et al. ............... 60/300 |
| 5,259,190 A * | 11/1993 | Bagley et al. ................. 60/300 |
| 5,449,541 A * | 9/1995 | Lipp et al. .................. 428/116 |
| 5,681,373 A * | 10/1997 | Taylor et al. .................... 96/11 |
| 5,731,562 A * | 3/1998 | Beckmeyer et al. ...... 219/69.12 |
| 6,097,011 A * | 8/2000 | Gadkaree et al. ............ 219/553 |

(Continued)

FOREIGN PATENT DOCUMENTS

AT    500 959    5/2006

(Continued)

OTHER PUBLICATIONS

International Search Report (PCT/EP2006/060895) dated Jul. 11, 2006.

*Primary Examiner*—Richard L Chiesa
(74) *Attorney, Agent, or Firm*—Collard & Roe, P.C.

(57) ABSTRACT

An apparatus for separating exhaust particulates from an exhaust gas stream, includes a ceramic honeycomb body with ducts through which exhaust gas can flow and which extend in the longitudinal direction of the honeycomb body, with the honeycomb body being provided with electrodes for generating an electric field which are each oriented transversally to the axis of the ducts. The electrodes are each formed by a group of ducts in which an electric conductor is introduced at least partly along their axial extension. It preferably includes a metallic coating.

20 Claims, 1 Drawing Sheet

U.S. PATENT DOCUMENTS

Figure 1:
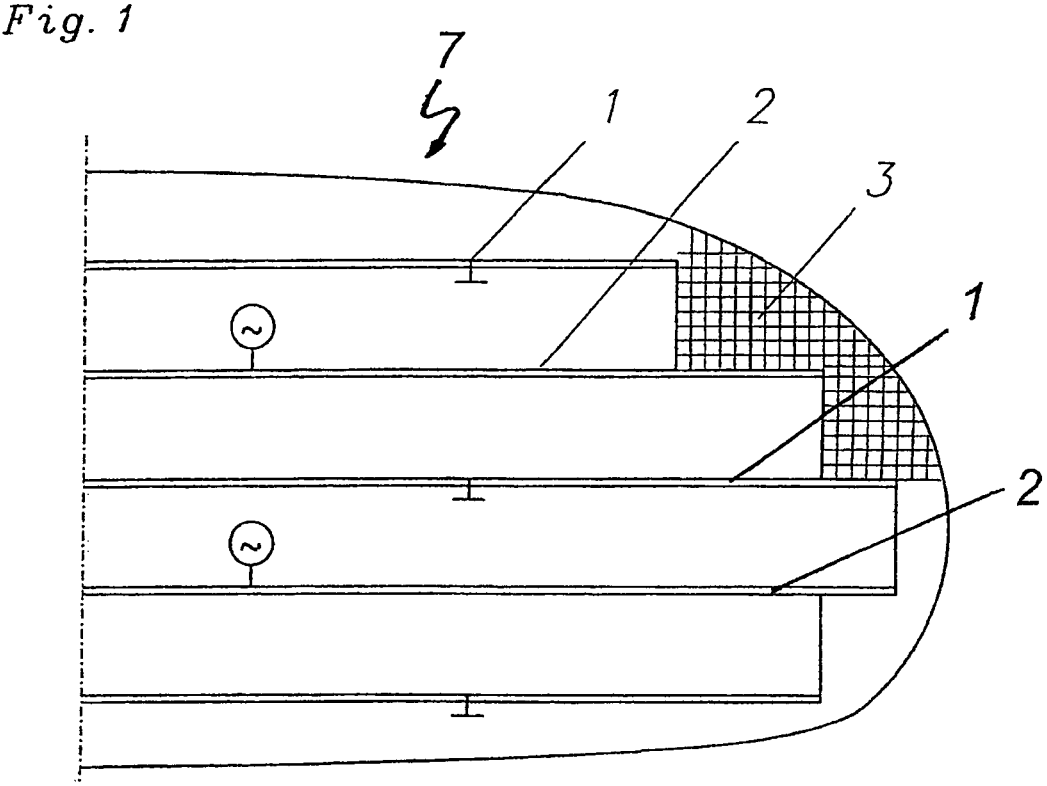

| | | |
|---|---|---|
| 6,290,757 B1 * | 9/2001 | Lawless .................. 96/19 |
| 6,843,822 B2 * | 1/2005 | Beall et al. ................ 55/523 |
| 7,041,157 B1 | 5/2006 | Fleck |
| 2001/0017026 A1 * | 8/2001 | Peters et al. ............. 55/282.3 |

FOREIGN PATENT DOCUMENTS

| | | |
|---|---|---|
| EP | 0 332 609 | 9/1989 |
| EP | 0 359 031 | 3/1990 |
| EP | 0 537 217 | 4/1993 |
| EP | 0 880 642 | 12/1998 |
| EP | 0 885 647 | 12/1998 |
| EP | 1 229 992 | 8/2002 |
| FR | 2 779 177 | 12/1999 |
| JP | 2003-049632 | 2/2003 |
| WO | WO 92/00485 | 1/1992 |
| WO | WO 97/02410 | 1/1997 |

\* cited by examiner

DEVICE FOR REMOVING SOOT PARTICLES FROM AN EXHAUST GAS STREAM

CROSS REFERENCE TO RELATED APPLICATIONS

Applicant claims priority under 35 U.S.C. §119 of Austrian Application No. 967/2005 filed Jun. 8, 2005. Applicant also claims priority under 35 U.S.C. §365 of PCT/EP2006/060895 filed Mar. 21, 2006. The international application under PCT article 21(2) was not published in English.

The invention relates to an apparatus for separating exhaust particulates from an exhaust gas stream, comprising a ceramic honeycomb body with ducts which can be flowed through by exhaust gas and extend in the longitudinal direction of the honeycomb body, with the honeycomb body being provided with electrodes for generating an electric field which is each oriented transversally to the axis of the ducts.

According to the state of the art, different embodiments of such apparatuses for separating exhaust particulates are known, which hereinafter shall be referred to as filters or as diesel particulate filters. The retrofitting of diesel particulate filters is focusing more and more on plasma-regenerated filter systems, especially with open ducts on both sides, which as the only ones can presumably ensure a regeneration of the filter at temperatures under 200° C., and very often even up to beneath 150° C. Systems of this kind are described for example in the patent specifications EP 0 880 642 B1, EP 0 332 609 B1, EP 0 537 217 B1, EP 0 885 647 B1 and A 1866/2004. The charged exhaust particulates are separated in the ducts of a honeycomb body with ducts open on both sides by an electric field which is established by electrodes outside of the honeycomb body and penetrates its ducts. As a result of the strength of this separation field, a very soft electron plasma develops which electrochemically oxidizes the particulates. In addition to this low regeneration temperature, this system has a further property, namely its high degree of separation. When the exhaust particulates are well charged and the cross section of the honeycomb body is dimensioned in such a way that a laminar flow can be obtained, as much as 98% to 99% of the particulates are separated.

Such known systems of this kind have difficulties however concerning their need for space, which applies especially in the case of retrofits. In order to provide the honeycomb body with the largest possible configuration, but to situate the same as close as possible to the engine, it would be advantageous to adjust the same as well as possible to the shape of the undercarriage close to the engine. This leads to asymmetrically elliptical and trapezoid cross sections, into which it is not possible to introduce a sufficiently homogeneous electric field with the help of external electrodes in order to carry out a regeneration.

Moreover, a further disadvantage is seen in known filter systems: In order to achieve a respective long-term stress-rupture strength in its metal housing (canning), it is clamped with a mat made of rock wool with high pressure into its metal sleeve (canning). The rock wool is often fixed with mica also under pressure, which mica only opens from a certain temperature and thus further increases the pressure of the mat on the honeycomb body on its part. This pressure is necessary in order to keep the honeycomb body at any temperature and over many 100,000 km at its place under any operational state. In order to withstand this high packing pressure, all honeycomb bodies are more or less round, or are at least strongly rounded off to elliptical. These shapes do not allow for even a close to homogeneous electric field by external electrodes in the interior of the honeycomb body.

A further disadvantage of known filter systems is that voluminous diesel engines, especially diesel engines for trucks, building machines, ship engines and the like, also require honeycomb bodies with very large cross sections. This is counteracted by the fact that in the case of an application of pulsed electric fields (see patent specifications EP 1 229 992 B1 or A 1866/2004 for example) the maximum electrode spacing can be approximately 30 mm to 40 mm, preferably 20 mm. This maximum possible electrode spacing limits the executable size of the honeycomb bodies.

U.S. Pat. No. 4,897,096 describes a particulate filter with a ceramic honeycomb body which is provided with ducts closed in an alternating manner and in which the exhaust particulates are separated mechanically on the walls of the ducts. For optimizing the incineration of separated exhaust particulates it is proposed to determine the thickness of the exhaust particulate layer deposited on the walls by using a pair of electrodes. These electrodes do not generate a field however which is oriented transversally to the axis of the ducts and they are also not suitable for this purpose.

It is therefore the object of the invention to provide an apparatus for separating exhaust particulates which avoids these disadvantages. In particular, the apparatus should enable a substantially homogeneous electric field in the interior of the honeycomb body even in the case of honeycomb bodies whose cross sections deviate from a circular or annular shape. Moreover, there should not be any limitations concerning the size of the honeycomb body. The apparatus shall be characterized by high structural stability and sturdiness.

These objects are achieved by in accordance with the invention by an apparatus for separating exhaust particulates from an exhaust gas flow, comprising a ceramic honeycomb body with ducts through which exhaust gas can flow and which extend in the longitudinal direction of the honeycomb body, with the honeycomb body being provided with electrodes for generating an electric field which is oriented transversally to the axis of the ducts. It is provided in accordance with the invention that the electrodes are each formed by a group of ducts in which an electric conductor is introduced at least partly along their axial extension. The introduction of a conductor can principally occur in different ways. Therefore the ducts of a group of ducts which represent an electrode can be filled up with an electric conductor over their entire cross section and over wide parts of their axial extension. Alternatively, electrically conductive wires, ribbon cables or flat irons can be pushed into the ducts which thus extend only partly over the cross section of the ducts. It is preferably provided however that the electrodes are each formed by a group of ducts whose inside walls are each provided at least partly with a metallic coating along the axial extension of the ducts. Methods for coating the inside walls of the ducts are known, which is why the coating can occur by means of electrolytic methods. To provide the electric conductor in the form of a coating of the duct walls is especially advantageous for the reason that they hardly impair the structural stability and sturdiness of the honeycomb body.

In accordance with the invention, the electrodes are thus not arranged on the outer delimiting walls of the honeycomb body, but extend in the form of groups of ducts in the interior of the honeycomb body which were each provided with an electric conductor. Each of these groups defines an electrode. There are different possibilities of choosing those ducts which should form a part of a group of ducts and thus an electrode.

It would thus be possible that the groups of ducts are each formed by ducts arranged circularly about the longitudinal axis of the honeycomb body, so that each group of ducts defines a curved, preferably cylindrical electrode surface. It can also be provided however that the groups of ducts are each formed by ducts situated adjacent to one another, so that each group of ducts defines a plane electrode surface. Although the coated inside walls of the ducts principally represent three-dimensional arrangements, the cross section of the ducts is very small in comparison with the cross section of the honeycomb body however, so that an electrode formed by a group of ducts can be approximated by a plane or curved electrode surface with respect to its electric properties. In the case of ducts that are situated adjacent to each other and each have a rectangular cross section, the electrode surface can be imagined as such surface which is defined by the longitudinal axes of the respective ducts. Horizontal electrode surfaces are thus obtained which penetrate the honeycomb body and preferably extend parallel with respect to each other. It is understood that the electrode surfaces could also be arranged in a perpendicular way, such that ducts are chosen for coating which each lie above one another within a group of ducts forming an electrode.

In accordance with a preferred embodiment, two adjacent electrode surfaces have a distance of less than 40 mm and preferably a distance of 15 to 25 mm. This ensures a homogeneous electric field also in completely asymmetric configurations of the honeycomb body.

It can be provided that the groups of ducts are each formed by ducts situated next to one another, so that a curved, preferably cylindrical electrode surface is defined by each group of ducts.

It is provided in accordance with a preferred embodiment that two adjacent electrode surfaces each are contacted in an antipolar manner.

This can occur in such a way that the electric contact of an electrode surface is situated on a face side of the honeycomb body and the electric contact of the respectively adjacent electrode surfaces is made on the opposite face side of the honeycomb body. Preferably, the establishment of the contact of the respective electrode surface is made by metal brushes pushed into ducts which are provided with an electric conductor and are associated with the respective electrode surface, with at least one, preferably several metal bristles of the brush being inserted into each of the ducts. In order to prevent the likelihood of flashovers between two adjacent electrode surfaces, it is advantageous when the end of a duct having an electric conductor, which end is opposite of the contact point, comprises a free end section which extends approximately over an axial region of at least 10 to 20 mm. In addition, the end of the duct having an electric conductor, which end is opposite of the contact point, can be sealed.

In a preferred embodiment, the ducts which are located outside of the spatial area of the honeycomb body which is delimited by two adjacent electrode surfaces each are sealed at least on the entrance side. The degree of separation can thus be improved, because it is ensured in this way that the exhaust gas stream is only guided through such ducts in which there is a substantially homogeneous electric field, which means such ducts which are located within the spatial area of the honeycomb body which is delimited by two adjacent electrode surfaces each.

An embodiment of the honeycomb body with which the fine structure of the homogeneity of the electric field is improved in the individual ducts can be achieved with the help of the features of that embodiment, such that the clear opening of those ducts which are located within the spatial area of the honeycomb body which is delimited by two adjacent electrode surfaces each is each arranged in a rectangular way, with two ducts mutually following each other normally to the electrode surfaces being each mutually offset in a brickwork-like manner. A further increase in the structural stability can be achieved by the measures of a further embodiment, such that those ducts which are located outside of the spatial area of the honeycomb body which is delimited by two adjacent electrode surfaces have a smaller clear opening than those ducts which are situated within the spatial area of the honeycomb body which is delimited by two adjacent electrode surfaces each. Those sections of the honeycomb body which are located outside of the areas with a homogeneous electric field and thus preferably do not contribute to the filtering of particulates are thus provided with a denser configuration and thus contribute to increasing the structural stability of the honeycomb body. It can also be provided that the clear opening of such ducts which are situated outside of the spatial area of the honeycomb body which is delimited by two adjacent electrode surfaces each are provided with a square configuration.

In order to facilitate the performance of the metallic coating and to avoid impairing the structural stability to a considerable extent, it can be provided that those ducts which are provided with an electric conductor have thicker inside walls and a larger clear opening than other ducts of the honeycomb body.

The apparatus in accordance with the invention especially allows for advantageous embodiments such that the honeycomb body has a convex or trapezoid circumferential line.

Figure 2:
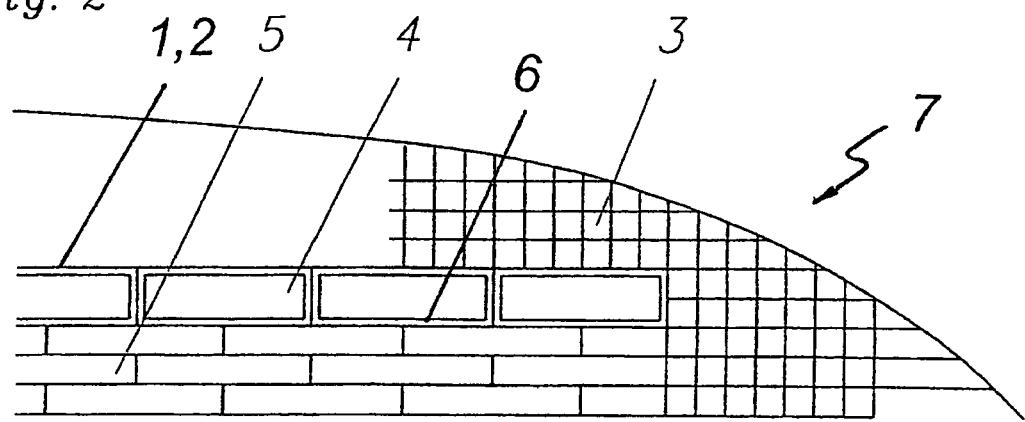

The invention is now explained by reference to the enclosed drawings, wherein:

FIG. 1 shows a schematic representation of a cross section of an embodiment of an apparatus in accordance with the invention, especially showing electrode surfaces extending horizontal and parallel with respect to each other, and FIG. 2 shows a detailed view of FIG. 1. It especially shows the arrangement of the ducts and the coating of ducts of a group of ducts which define an electrode surface.

FIGS. 1 and 2 each show a schematic representation of a cross section of a honeycomb body 7, preferably made of a ceramic material. A honeycomb body 7 with a convex circumferential line, more precisely an elliptical one, is shown. It could also have another cross-sectional shape such as a trapezoid shape. This further development in accordance with the invention is especially advantageous for embodiments of this kind. The honeycomb body 7 can be present in a monolithic form, or be composed of several sections.

In accordance with the state of the art, the honeycomb body 7 would comprise a centric cylindrical bore in which a high-voltage electrode is arranged. The counter-electrode would be located on the outside of the honeycomb body 7. Such a bore is no longer necessary according to the features in accordance with the invention. Instead, the honeycomb body 7 can be provided in a structurally uniform manner, as is shown in FIGS. 1 and 2.

Honeycomb body 7 comprises ducts 3, 4, 5 which extend in the longitudinal direction of the honeycomb body 7 and are open approximately on both sides on the face sides of honeycomb body 7. In the case of some honeycomb bodies 7 which are used in practice, the ducts 3, 4, 5 are opened and closed in an alternating manner, so that the exhaust gas stream enters through a duct 3, 4, 5 which is open on the inlet side but closed on its outlet side, and for leaving the honeycomb body 7 needs to pass through the inside wall of the respective duct 3, 4, 5 to the adjacent duct 3, 4, 5 which is sealed on the inlet side but is open on the outlet side. The invention is principally suitable for both embodiments, i.e. the one which is open on both sides and one with ducts 3, 4, 5 which are open in an alternating manner.

In accordance with the invention, the electrodes 1, 2 are each formed by a group of ducts 4 into which an electric conductor 6 is introduced at least partly along their axial extension. According to the embodiment shown in FIGS. 1 and 2, the electrodes 1, 2 are each formed by a group of ducts 4 whose inside walls are each provided at least partly with a metallic coating 6 along the axial extension of the ducts 4. As was already mentioned, although the coated inside walls of the ducts 4 principally represent three-dimensional arrangements, the cross section of the ducts 4 is very small in comparison with the cross section of the honeycomb body 7, so that an electrode formed by a group of ducts can be approximated with respect to its electric properties by a plane electrode surface 1, 2. As is shown especially in FIG. 2, the groups of ducts 4 are each formed by ducts 4 situated adjacent to one another, so that a plane electrode surface 1, 2 is formed by each group of ducts 4. In this case of ducts 4 situated adjacent to one another which each have a rectangular cross section, the electrode surface 1, 2 can be imagined as the surface which is defined by the longitudinal axes of the respective ducts 4.

Methods for producing the coating 6 are known. Therefore the coating 6 can be produced by means of electrolytic methods for example where a wire is drawn into the coated duct 4 and metallic ions of the electrolyte are separated on the inside wall of duct 4 when a voltage is applied. Copper, copper and chromium layers or other conductive materials which have proven to be suitable in the production and operation of the apparatus in accordance with the invention can be provided for the metallic coating 6.

As can be seen from FIG. 1, the plane electrode surfaces 1, 2 each extend horizontally and parallel with respect to each other. The distance of two adjacent electrode surfaces 1 and 2 is preferably less than 40 mm, and approximately 15 to 25 mm. A homogeneous electric field can thus be ensured between the electrode surfaces 1 and 2, especially in such spatial areas which are located within the spatial area of honeycomb body 7 which is delimited by two adjacent electrode surfaces each, which shall also be referred to below as homogeneous field area.

Two adjacent electrode surfaces 1 and 2 are each in contact with each other in a counter-polar manner, with electrode surface 1 being ground in FIG. 1 for example and electrode surface 2 being supplied with a pulsed high voltage. The apparatus in accordance with the invention can also be applied to embodiments where a direct voltage is supplied to the electrode surface 2.

Electric contact points (not shown in FIGS. 1 and 2) of the electrode surfaces 1 are arranged on a face side of the honeycomb body 7, with the electric contact point of the respective adjacent electrode surfaces 2 preferably being located on the opposite face side of the honeycomb body 7. The contact point of the respective electrode surface 1, 2 is formed by the metal brushes which are inserted into the metallically coated ducts 4 and which are associated with respective electrode surfaces 1, 2, with at least one, preferably several metal bristles of the brush being inserted into each of the ducts 4.

In order to prevent the likelihood of flashovers between two adjacent electrode surfaces 1, 2, it is advantageous as mentioned above when the end of a metallically coated duct 4 which is opposite of the contact point comprises a free end section which extends approximately over an axial region of at least 10 to 20 mm. Preferably, the end of the duct which is opposite of the contact point is sealed, which duct is provided with an electric conductor 6.

An embodiment of the honeycomb body 7 will be discussed below which has proven to be especially advantageous with respect to structural stability and sturdiness. As a result, the ducts 3 which are situated outside of the homogeneous field area can have a smaller clear opening than those ducts 4, 5 which are located within the homogeneous field area, so that the honeycomb body 7 has a denser structure in these areas. The clear opening of these ducts 3 which are situated outside of the homogeneous field area can also be provided with a square configuration, thus further increasing their structural sturdiness. The ducts 4 which are provided with a metallic coating 6 can have thicker inside walls and a larger clear opening than all other ducts 3, 5 of the honeycomb body 7. On the one hand, this facilitates the production of the metallic coating 6, and ensures on the other hand their structural sturdiness as a result of the thicker inside walls. As is shown especially in FIG. 2, the clear opening of those ducts 5 which are situated within the homogeneous field area can be arranged in a rectangular way, with two ducts following each other normally to the electrode surfaces 1, 2 each being offset with respect to each other in the manner of brickwork. This arrangement of the honeycomb body especially improves the fine structure of the homogeneity of the electric field in the individual ducts.

The ducts 3 which are situated outside of the homogeneous field area can also be sealed on the entrance side and optionally also on the exit side. This helps improve the rate of separation because it is ensured in this manner that the exhaust gas stream is guided only through such ducts 5 in which there is a substantially homogeneous electric field.

A filter for separating exhaust particulates is thus realized with the help of the apparatus in accordance with the invention, which filter ensures a substantially homogeneous electric field in the interior of the honeycomb body 7 even in the case of a honeycomb body 7 whose cross section deviates from a circular or annular form. Moreover, there are no limitations concerning the size of the honeycomb body 7 since an adjusted number of electrode surfaces 1, 2 can be provided depending on the size of the honeycomb body 7. The apparatus is characterized by high structural stability and sturdiness.

The invention claimed is:

1. An apparatus for separating exhaust particulates from an exhaust gas stream, comprising a ceramic honeycomb body with ducts through which exhaust gas can flow and which extend in the longitudinal direction of the honeycomb body, with the honeycomb body being provided with electrodes for generating an electric field which is each oriented transversally to the axis of the ducts, wherein the electrodes are each formed by a group of ducts in which an electric conductor is introduced at least partly along their axial extension.

2. The apparatus according to claim 1, wherein the electrodes are each formed by a group of ducts whose inside walls are each provided at least partly with a metallic coating along the axial extension of the ducts.

3. The apparatus according to claim 1, wherein the groups of ducts are each formed by ducts situated adjacent to one another, so that each group of ducts defines a plane electrode surface.

4. The apparatus according to claim 3, wherein the plane electrode surfaces are each parallel with respect to each other.

5. The apparatus according to claim 4, wherein two adjacent electrode surfaces have a distance of less than 40 mm.

6. The apparatus according to claim 5, wherein two adjacent electrode surfaces have a distance of 15 to 25 mm.

7. The apparatus according to claim 1, wherein the groups of ducts are each formed by ducts situated next to one another, so that a curved electrode surface is defined by each group of ducts.

8. The apparatus according to claim 3, wherein two adjacent electrode surfaces each are contacted in an antipolar manner.

9. The apparatus according to claim 8, wherein the electric contact of an electrode surface is situated on a face side of the honeycomb body and the electric contact of the respectively adjacent electrode surfaces is made on the opposite face side of the honeycomb body.

10. The apparatus according to claim 9, wherein the establishment of the contact of the respective electrode surface is made by metal brushes pushed into ducts which are provided with an electric conductor and are associated with respective electrode surface, with at least one bristle of the brush being inserted into each of the ducts.

11. The apparatus according to claim 9, wherein the end of a duct having an electric conductor, which end is opposite of the contact point, comprises an end section which is free from a conductor.

12. The apparatus according to claim 11, wherein the end section has an axial extension of at least 10 to 20 mm.

13. The apparatus according to claim 9, wherein the end of the duct comprising an electric conductor is sealed, which end is opposite of the contact point.

14. The apparatus according to claim 3, wherein those ducts which are located outside of the spatial area of the honeycomb body which is delimited by two adjacent electrode surfaces each are sealed at least on the entrance side.

15. The apparatus according to claim 3, wherein the clear opening of those ducts which are located within the spatial area of the honeycomb body which is delimited by two adjacent electrode surfaces each is each arranged in a rectangular configuration, with two ducts mutually following each other normal to the electrode surfaces are each mutually offset in a brickwork configuration.

16. The apparatus according to claim 3, wherein those ducts which are located outside of the spatial area of the honeycomb body which is delimited by two adjacent electrode surfaces each have a smaller clear opening than those ducts which are situated within the spatial area of the honeycomb body which is delimited by two adjacent electrode surfaces each.

17. The apparatus according to claim 16, wherein the clear opening of those ducts which are situated outside of the spatial area of the honeycomb body which is delimited by two adjacent electrode surfaces each are provided with a square configuration.

18. The apparatus according to claim 2, wherein those ducts which are provided with an electric conductor have thicker inside walls and a larger clear opening than other ducts of the honeycomb body.

19. The apparatus according to claim 1, wherein the honeycomb body has a convex circumferential line.

20. The apparatus according to claim 1, wherein the honeycomb body has a trapezoid circumferential line.

\* \* \* \* \*